June 1, 1937. M. J. ULINE 2,082,665
METHOD AND APPARATUS FOR MANUFACTURING OBLONG BLOCKS OF CLEAR ICE
Filed Jan. 27, 1934 2 Sheets-Sheet 1

June 1, 1937. M. J. ULINE 2,082,665
METHOD AND APPARATUS FOR MANUFACTURING OBLONG BLOCKS OF CLEAR ICE
Filed Jan. 27, 1934 2 Sheets-Sheet 2

Inventor
M. J. ULINE
By Pattison, Wright + Pattison Attorneys

Patented June 1, 1937

2,082,665

UNITED STATES PATENT OFFICE 2,082,665

METHOD AND APPARATUS FOR MANUFACTURING OBLONG BLOCKS OF CLEAR ICE

Migiel J. Uline, Washington, D. C.

Application January 27, 1934, Serial No. 708,665

6 Claims. (Cl. 62—105)

This invention relates to a method and apparatus for manufacturing oblong blocks of clear ice of a predetermined definite size and weight, free from rough ends and having sharp edges.

In the art of manufacturing blocks of ice as now carried out in most ice plants, the upper ends of the blocks are provided with what is known in the art as a white end, formed by insufficient agitation in the freezing of the blocks within the cans and various attempts have been made to dispense with this cup end which is generally formed of white ice, but so far all attempts to freeze ice without what is known as the white end have been unsuccessful.

With my method I am able to freeze a larger block of ice in less time than was possible before as by forming the cans of a greater height and filling the same to within one inch of the top, the brine acts on the water within the upper portion of the can instead of air which prevents the cooling medium from being carried off by radiation, thereby producing a block with a small cup having a white band which can be cut off, the chips being utilized to cool the water used for filling the cans, and with my apparatus the method of forming blocks of ice can be carried out in the ordinary layout of an ice plant as I provide means for receiving the cakes of ice from the cans and conveying the same through a cutting machine where the cup and white ends of the cakes are cut off so as to produce a perfect rectangular cake of ice free from all defects and impurities.

I am aware that it is old in the art to take a large cake of ice and cut it into small cubes, but my invention consists in manufacturing large cakes of ice of a standard weight and size, the entire body of which is formed of clear ice, the white and rough end being cut off.

To produce a cake of this character of the standard weight and size, I employ cans of a greater height than now employed and build up the cake of ice within the can to such a height that the white band which forms on the upper end irrespective of the height can be cut off so that all of the cakes of ice will be of a predetermined length and each cake will be free from impurities of any kind and white ice, whereby I am able to score these cakes of ice so that they can be cut into sizes which will all be of a definite weight, thereby overcoming the difficulties existing in manufacturing ice.

Many attempts have been made to manufacture cakes of ice of a standard size and weight free from what is known as the white end so that the cake can be sub-divided into blocks of an equal weight and of the same hardness, but so far all attempts have failed for no one has discovered means for preventing the forming of the white end on the upper end of a cake of ice in the freezing of the same. Naturally when the cake having a white end is sub-divided, the block cut off the white end will not have the same weight as a block cut off the other end of the cake and naturally the block of white ice will not last as long as a block of clear hard ice and as a great many states are now compelling ice companies to use scoring machines so that each block of ice will be of a definite size and weight, I have produced a method which will allow this to be accomplished as I am able to remove the white end without increasing the cost of producing the block in view of the fact that the ice cut off the block is used to chill the water employed for filling the cans in forming the blocks of ice whereby I am able to form longer blocks of ice and cut off the white ends so as to produce a block of clear, hard ice.

Another object of my invention is to provide a construction of apparatus in which the cakes of ice are frozen in a unit of cans, which unit is removed from the brine tank and deposited into a dip tank containing hot water to heat the cans. The unit of cans is then removed from the dip tank and deposited onto a dump, which dump deposits the unit of cans onto an endless conveyor, which conveyor moves the blocks of ice into the path of travel of a cutting device, which device cuts off the rough or white end of the cake of ice and forms a perfectly square end, the chips of the ice cut by the cutting machine falling into a tank through which a coil passes, said coil being connected to a water supply so that the water in passing into the filling and measuring tank employed for filling the cans after they have been dumped, will be chilled or cooled to reduce the time of freezing, thereby reducing the cost of the manufacture of the block of ice.

The blocks after being cut, leave the conveyor and are deposited onto an incline, which incline leads to a storage room whereby I am able to dispense with many trap doors now employed in the ordinary ice plant to receive the cakes of ice from the cans as with my device only one trap door is necessary as the cakes of ice leave the conveyor one at a time and pass one at a time into the storage room.

Other and further objects and advantages of the invention will be hereinafter set forth and the novel features thereof defined by the appended claims.

In the drawings,

Figure 3 is a perspective view of a block of ice manufactured in accordance with my method.

Figure 1:
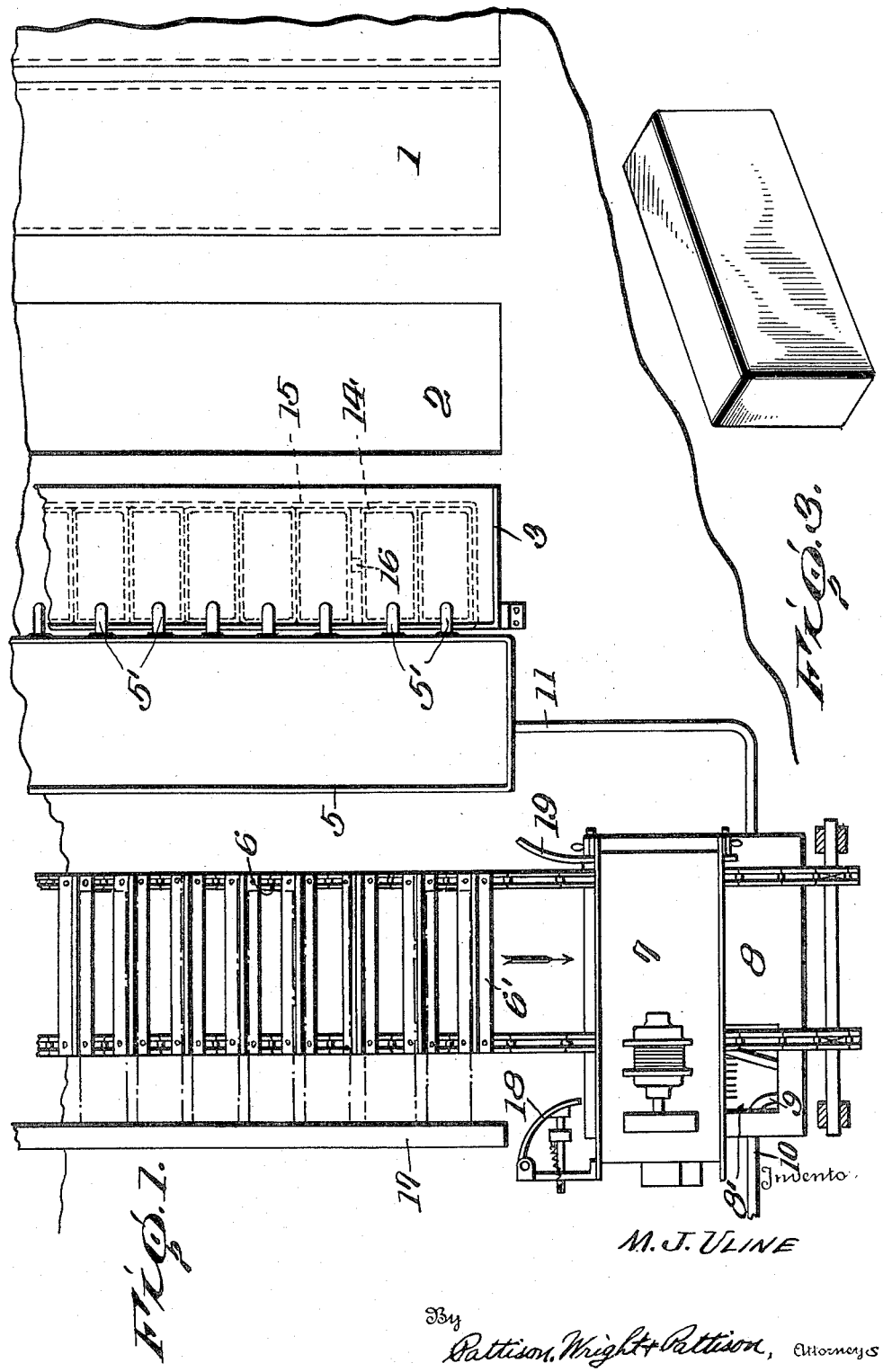
Figure 1 is a top plan view of a portion of an ice plant for carrying out my improved method of forming as a new article of manufacture a block of ice free from the rough and white end.

In the drawings I have shown an ice plant for carrying out my method consisting of a brine tank 1, a dip tank 2 adapted to contain hot water, a dump 3, a crane 4, a measuring tank 5, a conveyor 6, a hogging machine 7, a cooling tank 8, a coil 9 which is connected at one end to a water supply pipe 10 and at its other end to the measuring tank 5 as shown at 11. Disposed at the end of the conveyor 6 is an inclined chute 12 extending to an automatic door 13 of a storage room.

The tank 8 is provided with an opening 8' to receive the chips from the hogging machine whereby the water passing through the coil 9 to the filling tank 5 will be cooled or chilled so as to utilize the waste ice for cooling the water employed for filling the cans as will be later described.

The particular construction of conveyor and cutting machine are shown and described in companion applications executed even date herewith Serial Number 708,667, filed January 27, 1934, which matured into Patent No. 2,052,908, September 1, 1936 and Serial Number 708,666, filed January 27, 1934, which matured into Patent No. 2,058,744, October 27, 1936, respectively.

The conveyor employed is provided on its upper run with seventeen inverted T irons forming sixteen compartments to receive the sixteen cakes of ice from the sixteen cans which are on the dump and on the lower run with a similar number of T irons.

The cutting machine comprises a frame provided with cutting heads composed of a plurality of saws, said heads being arranged in the path of travel of a block of ice supported on the conveyor so that one end of the block of ice will be cut off squarely as brought into engagement with the cutting heads.

In carrying out my method I employ a plurality of cans 14, preferably sixteen in number, arranged within a frame 15 to form a unit, which unit is so constructed that the hooks 4' of the crane can engage supports 16 bridging the spaces 16' between the cans to lift the unit of cans out of the brine tank, deposit said cans into the dip tank or heating tank, lift the unit of cans out of said dip tank and deposit the same onto a dump from which they are dumped onto an endless conveyor.

In a companion application executed even date herewith, I have shown a particular construction of cutting machine and a particular construction of conveyor which forms a part of the apparatus used in carrying out my improved method and the construction of the cutting machine is such that it corresponds with the size of the conveyor being used so that the cakes of ice carried by the conveyor will be brought into contact with the cutting heads thereof.

The conveyor used is constructed to receive the sixteen cakes of ice from the sixteen cans on the dump and the sixteen compartments formed on the conveyor by the T irons register with the cans on the dump when the conveyor is stopped and as these irons are placed in proper position on the conveyor the cakes slide in between the T irons and are supported and held spaced thereby in such a manner that they are prevented from tilting when brought into engagement with the cutting heads.

The standard block of ice now being manufactured and recognized by the ice manufacturing association is 46 inches over all in length and as it is impossible to manufacture a cake of ice without having a rough and white end, it is the purpose of this invention to increase the size of the block of ice being manufactured so that the rough end which is formed at the upper end can be cut off and yet the block of ice will still be 46 inches in length. The cans are preferably made 51 inches and are filled by the measuring tanks to one inch of the top and the particular construction of measuring tank 5 forms no part of my invention, but it is understood that this measuring tank is provided with compartments corresponding in number to the cans in the unit so that each compartment contains a predetermined amount of water, which quantity of water is sufficient to fill each can to within approximately 1 inch of the top.

Figure 2:
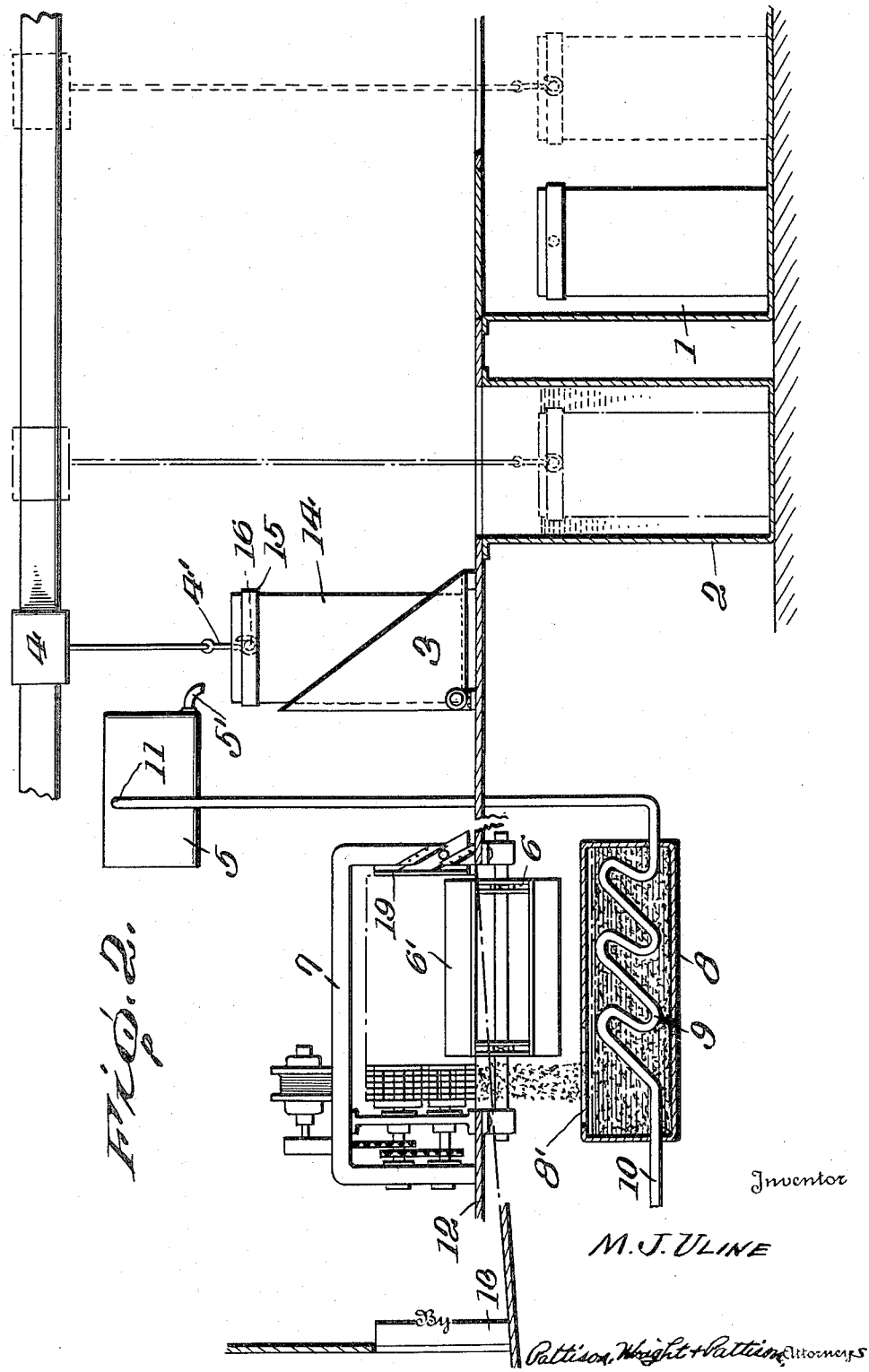
Figure 2 is a side elevation, partly in section, of a plant for carrying out my method of manufacturing rectangular blocks of ice.

The dump 3 is disposed between the dip tank 2 and the conveyor 6 and at such a position that the outlets 5' of the measuring tank will be over the cans when arranged within the dump as shown in Figure 2. The dump is so positioned in respect to the conveyor that when it is rocked to dump the ice out of the cans, the blocks of ice will slide onto the lower flanges of the substantially inverted T-shaped supports 6' carried by the chains of the conveyor until they engage a bumper 17 disposed to the opposite sides of the conveyor. This conveyor has seventeen supporting bars on the upper run of the chains and seventeen supporting bars on the lower runs of the chains, forming sixteen receiving compartments on each run to receive the sixteen blocks of ice from the unit of cans.

The conveyor is adapted to be driven by a geared electric motor and by employing a suitable switch, it can be either automatically or manually controlled. In either event it is adapted to be intermittently driven so that when the dump containing the unit of cans is operated, the conveyor will be stationary to receive the sixteen cakes of ice and when the dump is returned, the automatic control will start the conveyor to move slowly so as to carry the cakes of ice through the frame of the cutting machine, the yielding guide 18 being employed for forcing the cakes of ice against the adjustable gauge 19, which gauge can be set so that the cake of ice can be cut off at any distance desired, it preferably being set so that the cake is cut off to form a block of ice 46 inches long.

When the dump is brought back into vertical position so that the cans will be in an upright position under the discharge nozzles or outlets 5' of the measuring tanks, suitable valve mechanism will be actuated to allow the water in the measuring or filling tanks to pass into the cans and as this operation is being repeated, the water is chilled and cooled by passing through the tank 8 so that the water from the filling or measuring tank which is deposited into the cans is cooled or chilled so that when the unit of cans is lifted by the crane and carried up and deposited into the brine tank, the water therein will freeze quickly.

The ice cut off the end of the cake drops through the openings 8' into the tank 9 and as the water used for filling the measuring tank passes through a coil disposed in the tank 8, the water is naturally cooled in passing through the tank 8. As the operation is being repeated quickly, the water is kept at a low temperature in the filling tank. By using a cutting head formed of a plurality of saws, the ice is ground or cut into fine pieces so as to lower the temperature and maintain the temperature of the water within the tank 8 at such a low degree of temperature that the water used for filling the tank is kept at a low degree of temperature whereby the waste of ice in cutting off the end of the block is utilized to cool the water.

As soon as the blocks of ice slide out of the cans onto the conveyor, the dump is operated to return the unit of cans into a vertical position and the cans are immediately filled with ice water so that the crane can carry the unit of cans back and deposit them into the brine tank and as the conveyor starts to move as soon as it receives its load of cakes of ice and as it moves continuously when once started, by the time that that the sixteen cakes of ice have been cut off square at the white end, a new unit of cans containing blocks of ice are in position on the dump and as the bottom run of the conveyor is provided with seventeen additional supports forming sixteen compartments to receive the sixteen blocks of ice, the operation is repeated and in between the dumping of the ice and returning the cans, they are filled with chilled water, which water is chilled by the ice cut off the end of the block. I utilize the ice to chill the water to reduce the time of freezing of the blocks being formed and in my method it is important that the ice cut off the end of the block be in fine pieces to allow it to flow into a tank and be utilized for cooling the water for filling the cans.

In the apparatus as herein shown for carrying out my improved method, electrical devices are used such as motors, switches, and the like to operate and control the various devices of the plant whereby when the unit of cans is on the dump and the cans are full of ice, the control of the motor used for driving the conveyor will cause the conveyor to be at a standstill so that when the conveyor comes to a standstill, the dump can be operated in order to deposit the cakes of ice onto the conveyor and as the dump is returned to its normal position, the conveyor can be started and the nozzles controlling the outlets of the filling cans can be opened so as to refill the cans whereby the various devices will depend upon one another for operation so that the method can be carried out very easily with only one attendant.

In the specification I have shown and described an apparatus for handling units of cans consisting of sixteen cans, but I wish it to be clearly understood that I do not wish to limit my method to the handling of units containing any definite number of cans as I am aware that these units can be formed of any number of cans without departing from the spirit of my invention and that the number of compartments on the conveyor will correspond to the number of cans in the unit so that the blocks of ice will be held firmly on the conveyor without slapping against one another thereby preventing the blocks from becoming chipped and cracked and by constructing the apparatus as herein shown, I am able to handle the blocks of ice from the freezing cans to the storage room without allowing the blocks to come in contact with one another and in such a manner that perfect blocks of ice can be manufactured free from all impurities and cracks.

The rough or white end is commonly known in the art as a cup end of a cake of ice and the object of my invention is to remove this cup end of the ice in order to form a perfect cake free from all impurities.

What I claim is:

1. The method of manufacturing rectangular blocks of clear ice consisting in freezing rectangular blocks of ice having a length greater than the standard length block of ice, depositing said block of ice on a conveyor, moving said conveyor to bring the block of ice into engagement with a cutting machine to cut the ends squarely off and utilizing the chips of ice cut by the cutting machine to chill the water used for filling the cans to be frozen.

2. The method of manufacturing rectangular blocks of clear ice of a predetermined size, consisting in freezing rectangular blocks of ice with a length greater than the predetermined length desired, depositing said oversize cakes of ice onto a conveyor, moving said blocks of ice on said conveyor into the path of a cutting machine to cut off the ends of said blocks of ice to a predetermined length and utilizing the ice cut from the ends of the blocks to chill the water used for filling the cans to be frozen.

3. The method of forming rectangular blocks of clear ice of a predetermined size consisting in freezing rectangular blocks of ice having a length greater than the length of the required size in a unit of cans, removing said cans as a unit and depositing said cans in a dip tank to free the cakes of ice from said cans, removing said cans from the dip tank and depositing said cans onto a dump, operating said dump to deposit said cans on a conveyor, moving said conveyor to bring said blocks of ice into engagement with cutting heads to cut off the ends thereof, collecting the ice cut from said blocks into a receptacle having a cooling coil and passing water through the cooling coil of said receptacle to chill said water to refill said cans to reduce the time required to freeze the water in said cans when deposited in a brine tank.

4. The method of forming rectangular blocks of clear ice of a predetermined definite size and weight consisting in freezing rectangular blocks of ice having a greater length than required, cutting off the white end of the cake to form a block of a definite size and weight, utilizing the ice cut from the block to cool water and utilizing the chilled water for filling the cans to form the block of ice.

5. A plant of the kind described having brine vats, dipping vats, a dump and a conveyor arranged in line with one another, a filling tank arranged over the dump, a cutting machine arranged over the conveyor, a cooling tank having a coil with an outlet leading to the filling tank adapted to receive the portion of ice cut off by the cutting machine, said conveyor being provided with compartments to receive cakes of ice deposited thereon from said dump and convey said cakes through the cutting machine.

6. In an ice plant, the combination with a freezing room, means for freezing blocks of ice of a greater length than standard size, means for depositing said over-size blocks of ice on a conveyor, a chute leading from said freezing room adjacent one end of said conveyor, a machine disposed in the path of travel of said block of ice and in advance of said chute for gnawing off one end of a block of ice to reduce said block to the standard size and allowing said blocks to pass out of said freezing room through said chute.

MIGIEL J. ULINE.